US012711809B2

(12) United States Patent
Matsunami

(10) Patent No.: US 12,711,809 B2
(45) Date of Patent: Aug. 18, 2026

(54) DETERMINATION METHOD, DETERMINATION PROGRAM, AND INFORMATION PROCESSING APPARATUS

(71) Applicant: FUJITSU LIMITED, Kawasaki (JP)

(72) Inventor: Tomoaki Matsunami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 233 days.

(21) Appl. No.: 18/529,071

(22) Filed: Dec. 5, 2023

(65) Prior Publication Data

US 2024/0104963 A1 Mar. 28, 2024

Related U.S. Application Data

(63) Continuation of application No. PCT/JP2021/027739, filed on Jul. 27, 2021.

(51) Int. Cl.

| | |
|---|---|
| ***G06V 40/40*** | (2022.01) |
| ***G06T 3/60*** | (2024.01) |
| ***G06V 10/22*** | (2022.01) |
| ***G06V 40/16*** | (2022.01) |

(52) U.S. Cl.

CPC ................ *G06V 40/40* (2022.01); *G06T 3/60* (2013.01); *G06V 10/225* (2022.01); *G06V 40/166* (2022.01); *G06V 40/167* (2022.01); *G06V 40/171* (2022.01); *G06V 40/172* (2022.01)

(58) Field of Classification Search

CPC .... G06V 40/40; G06V 10/225; G06V 40/166; G06V 40/167; G06V 40/171; G06V 40/172; G06V 10/44; G06T 3/60; G06T 7/00

See application file for complete search history.

(56) References Cited

U.S. PATENT DOCUMENTS

| | | | | |
|---|---|---|---|---|
| 2013/0188840 A1 | 7/2013 | Ma et al. | | |
| 2018/0373923 A1* | 12/2018 | Negi | .................... | G06V 40/174 |
| 2019/0026544 A1* | 1/2019 | Hua | .................... | A61B 5/1128 |

FOREIGN PATENT DOCUMENTS

| | | |
|---|---|---|
| CN | 111144277 | 5/2020 |
| JP | 2006-099614 | 4/2006 |
| JP | 2011-009986 | 1/2011 |

(Continued)

OTHER PUBLICATIONS

K. Zhang et al., "Joint Face Detection and Alignment using Multi-task Cascaded Convolutional Networks", IEEE Signal Processing Letters (SPL), vol. 23, Issue 10, pp. 1499-1503, Oct. 2016.

(Continued)

*Primary Examiner* — Oneal R Mistry
*Assistant Examiner* — Justin Philip Cascais
(74) *Attorney, Agent, or Firm* — Fujitsu Intellectual Property Center

(57) ABSTRACT

A determination method includes acquiring a plurality of images which are captured at different times by a camera; and determining, when each of the plurality of images includes a first image region of a face of a person and a second image region which is located outside the first image region and has a shape which satisfies a predetermined condition, whether the face of the person is a display object based on a state of change in a positional relationship between the first image region and the second image region between the plurality of images.

10 Claims, 10 Drawing Sheets

(56) References Cited

FOREIGN PATENT DOCUMENTS

| | | | |
|---|---|---|---|
| JP | 2014-102711 | | 6/2014 |
| JP | 2014-219703 | | 11/2014 |
| JP | 2018-169943 | | 11/2018 |
| JP | 2019-197426 | | 11/2019 |
| WO | 2018/179723 | A1 | 10/2018 |
| WO | 2020/152917 | | 7/2020 |

OTHER PUBLICATIONS

WIPO, International Search Report with translation and Written Opinion mailed Oct. 5, 2021, in connection with PCT/JP2021/027739.

EESR—Extended European Search Report of European Patent Application No. 21951796.8 dated Jun. 28, 2024 (8 pages).

Jukka Komulainen et al., "Context based Face Anti-Spoofing", 2013 IEEE Sixth International Conferenceon Biometrics: Theory, Applications and Systems (BTAS), Jan. 16, 2014, pp. 1-8, XP093168557, DOI: 10.1109/BTAS.2013.6712690, ISBN: 978-1-4799-0527-0, Retrieved from the Internet: URL:https://ieeexplore.ieee.org/stampPDF/getPDF.jsp?tp=&arnumber=6712690&ref=aHR0cHM6Ly9pZWV1eHBsb3JILm11ZWUub3JnL2Fic3RyYWN0L2RvY3VtZW50LzY3M.

Xun Zhu et al., "Detection of Spoofing Medium Contours for Face Anti-Spoofing", IEEE Transactions on Circuits and Systems for Video Technology, IEEE, USA, vol. 31, No. 5, Oct. 28, 2019, pp. 2039-2045, XP011853048, ISSN: 1051-8215, DOI: 10.1109/TCSVT.2019.2949868, [retrieved on May 4, 2021].

CNOA—Chinese Office Action dated Apr. 10, 2026 for corresponding Chinese Patent Application No. 202180099659.5 with English Translation (24 pages).

European Office Action dated Jun. 16, 2026 for corresponding European Patent Application No. 21951796.8, 6 pages.

* cited by examiner

FIG. 2

[A]CAPTURED IMAGE

FRAME OF PHOTOGRAPH

[B]EDGE INTENSITY IMAGE (PART)

| 16 | 25 | 22 | 29 | 36 | 50 | 28 |
|---|---|---|---|---|---|---|
| 14 | 28 | 35 | 34 | 44 | 67 | 38 |
| 17 | 24 | 31 | 41 | 58 | 40 | 27 |
| 10 | 23 | 27 | 36 | 76 | 29 | 26 |
| 16 | 17 | 26 | 41 | 64 | 38 | 18 |
| 21 | 19 | 30 | 51 | 34 | 15 | 19 |
| 27 | 24 | 57 | 39 | 25 | 22 | 18 |

[C]DETECTED IMAGES

LINEAR IMAGE REGION

FIG. 4

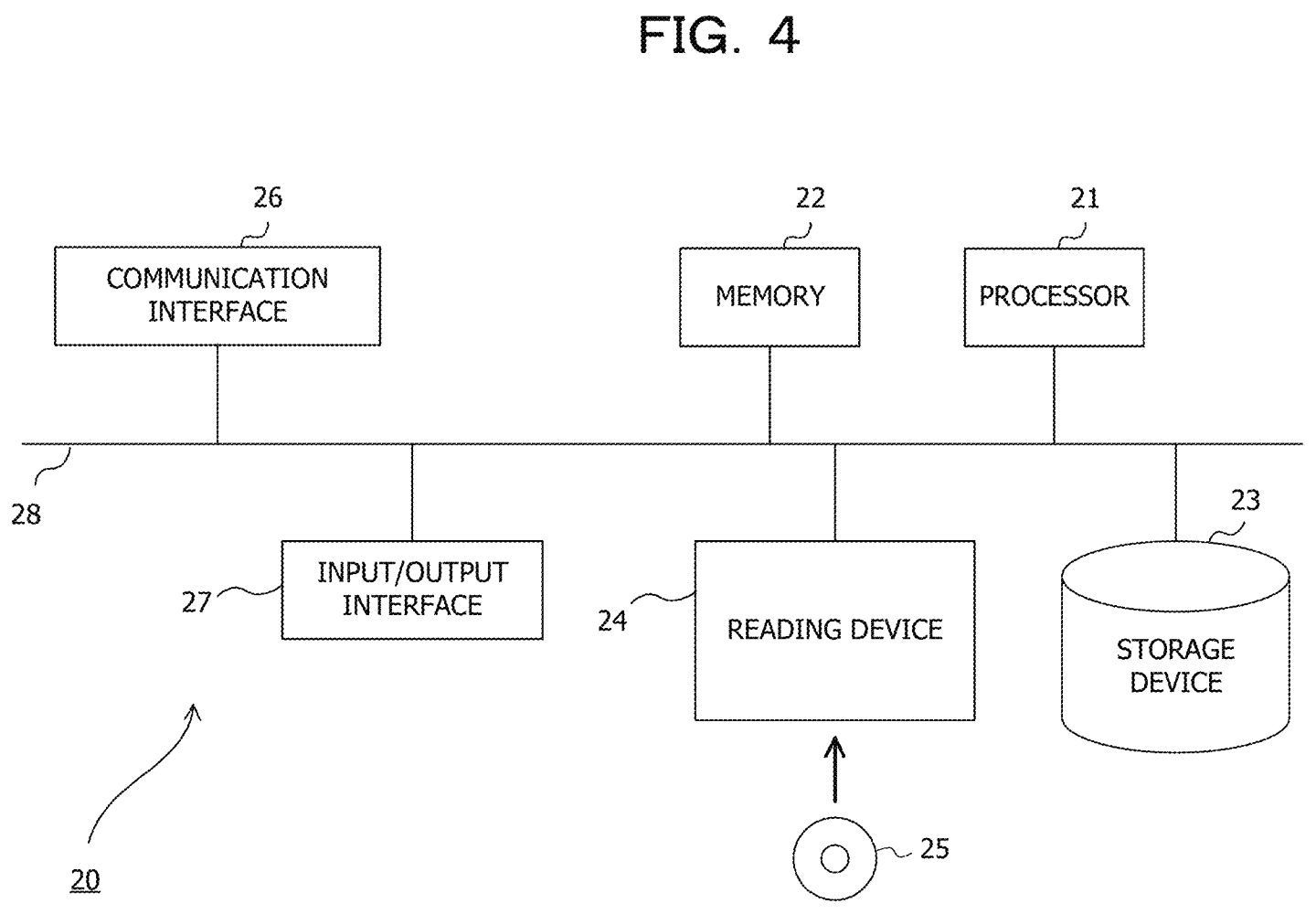

21 PROCESSOR

22 MEMORY

23 STORAGE DEVICE

24 READING DEVICE

25

26 COMMUNICATION INTERFACE

27 INPUT/OUTPUT INTERFACE

28

20

DETERMINATION METHOD, DETERMINATION PROGRAM, AND INFORMATION PROCESSING APPARATUS

CROSS-REFERENCE TO RELATED APPLICATION

This application is a continuation application of International Application PCT/JP2021/027739 filed on Jul. 27, 2021 and designated the U.S., the entire contents of which are incorporated herein by reference.

FIELD

The embodiment relates to a technique for determining an image.

BACKGROUND

The biometric authentication technique is a technique for performing identity verification using biometric features such as a fingerprint, a face, and a vein. In the biometric authentication technique, a biometric feature acquired in a scene requiring verification is compared (collated) with a biometric feature registered in advance, and it is determined whether or not the acquired biometric feature and the registered biometric feature match each other, thereby performing the identity verification.

Related art is disclosed in Patent Document 1: Japanese Patent Application Laid-Open No. 2006-99614, Patent Document 2: Japanese Patent Application Laid-Open No. 2011-9986, Patent Document 3: Japanese Patent Application Laid-Open No. 2018-169943, Patent Document 4: Japanese Patent Application Laid-Open No. 2019-197426, Patent Document 5: Japanese Patent Application Laid-Open No. 2014-219703 and Non Patent Document: Kaipeng Zhang et al., "Face Detection and Alignment using Multi-task Cascaded Convolutional Networks", IEEE Signal Processing Letters (SPL), Volume 23, Issue 10, Oct. 2016, p. 1499 to 1503.

SUMMARY

According to one aspect of the embodiments, a determination method includes: acquiring a plurality of images which are captured at different times by a camera; and determining, when each of the plurality of images includes a first image region of a face of a person and a second image region which is located outside the first image region and has a shape which satisfies a predetermined condition, whether the face of the person is a display object based on a state of change in a positional relationship between the first image region and the second image region between the plurality of images.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating a method of detecting a linear image region;

FIG. 4 is a diagram illustrating an example of a hardware configuration of a computer;

DESCRIPTION OF EMBODIMENTS

Figure 1:
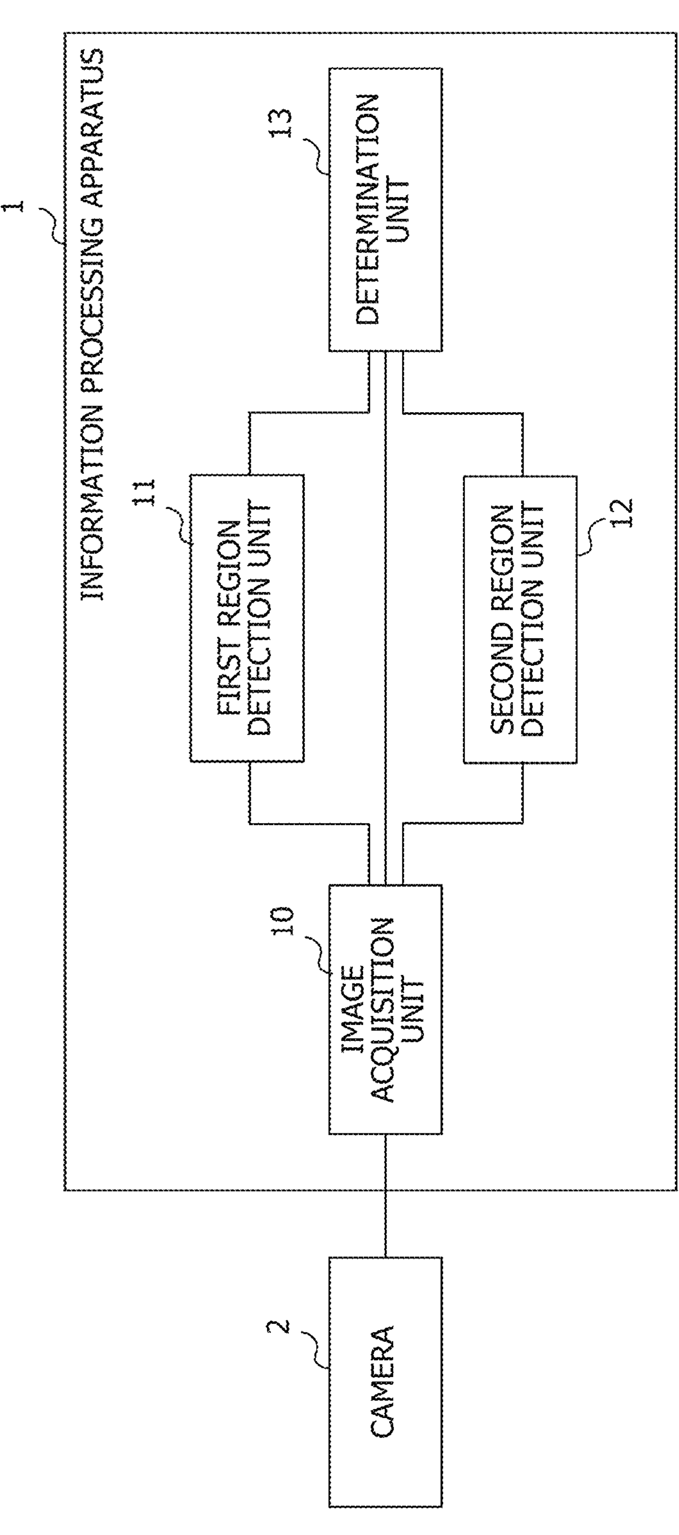
FIG. 1 is a diagram illustrating a configuration of an exemplary information processing apparatus.

A face authentication technique, which is one of the biometric authentication techniques, is attracting attention as a method for identifying a person in a non-contact manner. The face authentication technique is used in various applications such as access management of a personal terminal such as a personal computer (PC) or a smartphone, an entry/exit management, and identity verification at a boarding gate in an airport.

Unlike information used as biometric features in other biometric authentication techniques such as fingerprint authentication and palm vein authentication, information on a face image used as biometric features in this face authentication technique may be acquired by capturing with a general camera without using a special sensor. In addition, face images are often published on the Internet by social networking services (SNS) or the like. Therefore, there is a concern that a fraudulent act in which another person impersonates the person himself/herself may be performed by presenting a photograph in which a published face image is printed or a screen of a smartphone or the like on which the face image is displayed to the camera.

Therefore, several techniques have been proposed for determining whether a captured image captured by a camera is a captured image of an actual person or a captured image of a displayed object of a person such as a photograph of a person or a display screen showing a person (see, for example, Patent Documents 1 to 5).

For example, there is known a biometric identification device that identifies whether an object from which biometric information (for example, a face image) is acquired is a living body or a non-living body. This apparatus acquires an image including the biological information of the object, detects a a biological region (face region) from the acquired image, and compares an image feature of the detected biological region with an image feature of a biological region obtained when a predetermined desired normal object is present at a predetermined position. As a result of the comparison, when it is determined that there is a difference equal to or greater than a predetermined value between both of the image features, the apparatus determines that the object is the non-living body. Further, as another method, this apparatus determines that the object is the non-living body when an object surrounding the biological region in a rectangular shape, a curved shape, a polygonal shape or the like is detected in a background region around a face.

In addition, for example, an identification card photographing system is known in which a tilt distortion of an image obtained by photographing an identification card may be accurately and automatically corrected so that the content described on the identification card may be suitably recognized. In this system, when a face is detected by a face detection unit in an image obtained by an imaging apparatus, a photograph region is detected by a photograph detection unit, and the aspect ratio of the image after tilt correction is corrected by using the size of the photograph obtained by the photograph detection unit.

In addition, for example, a face authentication processing device that accurately detects spoofing at the time of authentication is known. The apparatus includes a face recognition unit, a frame detection unit, an arrangement determination unit, and a validity determination unit. The face recognition unit acquires a captured image obtained by capturing a target person and detects a face of the target person in an input image of the captured image. The frame detection unit detects a linear frame in the input image. The arrangement determination unit determines whether or not there is a frame surrounding the face of the target person by using face position information acquired by the detection of the face and frame position information acquired by the detection of the frame. The validity determination unit determines validity of the authentication result of the face information of the target person based on an arrangement determination result of the frame.

In addition, for example, a face authentication system is known in which spoofing using an image that may be performed at the time of authentication of a target person is detected with high accuracy, and an illegal act of a malicious third party due to spoofing is effectively suppressed. In this system, a flat panel detection unit inputs two captured images in which the same face image is captured by each of two imaging devices. Two face detection units detect respective face images of the two captured images. A determination unit determines whether or not the two face images are flat based on feature points corresponding to the two face images and the two face images. A validity determination unit determines validity of a face authentication result based on a determination result of whether or not the two face images are flat.

In addition, for example, there is known a face authentication system that eliminates a fraudulent act using a photograph or the like and prevents a decrease in convenience due to erroneous determination of the fraudulent act. This system performs face authentication of a person passing through an authentication area adjacent to a management area, and includes an image acquisition unit, a storage unit, a face collation unit, a scheme determination unit, and an authentication unit. The storage unit sequentially acquires face images including faces of persons by capturing the authentication area from a side of the management area. The storage unit stores a registered face image of a user registered in advance. The face collation unit collates the acquired face image with the registered face image. When the temporal change of the face image is small, the scheme determination unit determines that it is the fraudulent act. The authentication unit authenticates, as a user, a person who matches the registered face image and is not determined to perform the fraudulent act. In this system, when a change in a predetermined local area in the face image is detected, the scheme determination unit determines that it is not the fraudulent act.

In addition, as a technique used for an image determination, for example, a technique for detecting an image region of a person face from a captured image has been proposed (for example, see Non-Patent Document 1).

There is a case where sufficient determination accuracy may not be obtained when determining whether a captured image is obtained by capturing an actual person or a display object of a person such as a photograph of the person or a display screen showing the person based on one captured image. For example, in one captured image acquired at a certain point in time, although the captured image is actually an image of an object in the background, an image of a frame as the image of the object may be located around a face image, and thus the captured image may be erroneously determined as a captured image of the display object.

In one aspect, the disclosure is to improve accuracy in determining whether or not a captured image is a captured image of a display object of a person.

Hereinafter, embodiments will be described in detail with reference to the drawings.

FIG. 1 illustrates a configuration of an exemplary information processing apparatus 1. The information processing apparatus 1 determines whether an image captured by the camera 2 is an image obtained by capturing an actual person or an image obtained by capturing a display object of a person.

The information processing apparatus 1 includes an image acquisition unit 10, a first region detection unit 11, a second region detection unit 12, and a determination unit 13.

The image acquisition unit 10 acquires a plurality of images captured at different times by the camera 2.

The first region detection unit 11 detects an image region of a face of a person in each of the plurality of images acquired by the image acquisition unit 10. Note that several methods are known as a method for detecting the image region of the face of the person from a captured image. The first region detection unit 11 may use any of these methods, and may use, for example, the method proposed in Non-Patent Document 1 described above.

The second region detection unit 12 detects an image region having a shape satisfying a predetermined condition from a remaining region outside the image region of the face of the person in each of the plurality of images acquired by the image acquisition unit 10.

The determination unit 13 determines whether or not the face of the person represented in the plurality of images acquired by the image acquisition unit 10 is a display object. The determination unit 13 performs this determination based on a change state between the plurality of images in the positional relationship between the image region of the face detected by the first region detection unit 11 and the image region having the shape detected by the second region detection unit 12.

Next, a method of detecting a linear image region from an image region of a captured image will be described with reference to FIG. 2. This method is a method used by the second region detection unit 12 in the information processing apparatus 1 in FIG. 1 to detect the linear image region as the image region having the shape satisfying the predetermined condition.

In FIG. 2, an image example indicated as [A] is a captured image obtained by capturing a photograph (display object) of a face of a person. Since a photographic paper is easily bent, a shape of a frame of an edge portion of the photograph, which should be originally linear, is curved in this image example.

In this method, first, an edge intensity map representing an edge intensity at a position of each pixel as the edge intensity of each pixel is generated from the captured image as an edge intensity image.

In FIG. 2, [B] is an example of the edge intensity image and is related to a region (a region including a part of the frame) of 7 pixels in each of vertical and horizontal directions which are some regions of the image [A] (a part of the remaining region obtained by excluding the image region of the face from the edge intensity image of the captured image). In this example of the edge intensity image, a value of the edge intensity for each pixel is represented by being arranged at a position of each pixel.

Next, pixels constituting the linear image region are selected. Note that in the following description, the pixels constituting the linear image region are referred to as "specific pixels". The selection of the specific pixel is performed by a following procedure.

Note that in the description of this procedure, in the edge intensity image of [B] of FIG. 2, the pixel column at the upper end (the pixel column arranged horizontally) is referred to as a first pixel column, and the pixel column adjacent to and below the first pixel column is referred to as a second pixel column. Hereinafter, similarly, the third, fourth, fifth, and sixth pixel columns are defined, and the pixel column at the lower end of the edge intensity image is referred to as the seventh pixel column.

First, a pixel having the maximum edge intensity among the pixels included in the first pixel column in the edge intensity image is selected as a first specific pixel.

In the edge intensity image of [B] of FIG. 2, the pixel having the maximum edge intensity among the seven pixels constituting the first pixel row is a pixel having an edge intensity value of "50". Therefore, this pixel is selected as the first specific pixel. Note that in [B] of FIG. 2, the position of the selected specific pixel is shaded.

Next, in the edge intensity image, from a pixel column adjacent to the pixel column (the pixel column including the specific pixel) which is a selection target in the selection of the above-described specific pixel, a pixel which is adjacent to the specific pixel and has the maximum edge intensity is selected as the next specific pixel.

As described above, in a pixel selection which is performed first, the pixel having the edge intensity value of "50" is selected as the specific pixel from the first pixel column which is the selection target in the edge intensity image in [B] of FIG. 2. Therefore, in this case, the pixel column adjacent to the pixel column which is the section target in the selection of the specific pixel is the second pixel column. Among the pixels included in the second pixel column, the pixels adjacent to the specific pixel are three pixels having edge intensity values of "44", "67", and "38", respectively. Since the pixel having the maximum edge intensity among these three adjacent pixels is the pixel having the edge intensity value of "67", this pixel is selected as the next specific pixel.

After the next specific pixel is selected in this way, the above-described selection of the next specific pixel is repeated for each pixel column.

In the edge intensity image in [2] of FIG. 2, when the specific pixel having an edge intensity value of "67" is selected from the second pixel column, the pixel column adjacent to the pixel column which is the selection target in the selection of the specific pixel becomes the third pixel column this time. Among the pixels included in the third pixel column, the pixels adjacent to the specific pixel are three pixels having edge intensity values of "58", "40", and "27", respectively. Since the pixel having the maximum edge intensity among the three pixels is the pixel having the edge intensity value of "58", this pixel is selected as the next specific pixel.

Thereafter, in the same manner, the selection of the next specific pixel is repeatedly performed with each pixel column of the fourth column, the fifth column, the sixth column, and the seventh column as the selection target. By repeating this selection, the pixels having edge intensity values of 76", "64", "51", and "57" are selected as the specific pixel from the pixel columns.

Next, an image region formed by a specific pixel group obtained by repeating the selection of the specific pixel is detected in the edge intensity image, thereby detecting a linear image region in the captured image.

As a result of the selection described so far, the pixels having edge intensity values of "50", "67", "58", "76", "64", "51", and "57" are selected, respectively, as the specific pixel from each of the first to seventh pixel columns in the edge intensity image in [B] of FIG. 2. A linear image region formed by the specific pixel group including these specific pixels is detected from the captured image illustrated in [A] of FIG. 2.

In FIG. 2, in the image example of [C], a result of detection of a linear image region performed on the image example of [A] is indicated by a broken line. Note that in the image example of [C], it is indicated that linear image region is detected along each of the left frame and the right frame of the edge portion of the photograph of the face of the person. This is because the linear image region is detected for each of the two divided images obtained by dividing the image of [A] on the left and right sides.

Note that in this embodiment, the linear image region is detected from the image region of the captured image as described above. In the following description, the linear image region may be referred to as a "linear region".

Next, a method of determining whether or not a face of a person represented in a captured image is a display object will be described. This method is a method used by the determination unit 13 in the information processing apparatus 1 of FIG. 1.

As described above, the image example of [A] of FIG. 2 is a captured image obtained by capturing a photograph (display object) of a face of a person. In such a captured image, it is estimated that changes between captured images obtained by capturing at different times regarding a positional relationship between the image region of the face of the person and the linear region (the frame of the edge portion of the photograph) detected as described above are synchronized.

Figure 3:
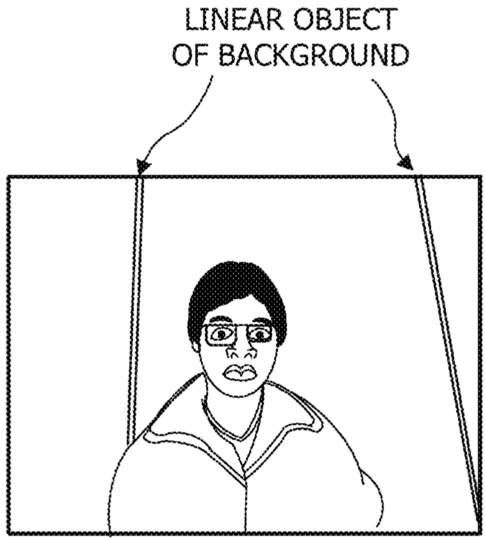
FIG. 3 is an example of a captured image obtained by capturing an actual person.

On the other hand, the image example of FIG. 3 is an example of a captured image obtained by capturing an actual person. In this image example, a wall is captured as a background of the person. The wall includes a linear object, and the linear object is also included in the captured image.

In the above-described method of detecting the linear region, an image region of such a linear object is also detected from the captured image. However, in such a captured image, it is estimated that changes between captured images obtained by capturing at different times regarding a positional relationship between the image region of the face of the person and the liner region (liner object of the wall) are not synchronized and change independently.

Therefore, in the present method, it is determined whether or not the changes between the captured images obtained by capturing at different times regarding the positional relationship between the image region of the face of the person and the liner region are synchronized. Further, in this determination, when determining that the changes in the positional relationship between the two captured images are not synchronized with each other, it is determined that the face of the person included in the captured image is not the display object.

Note that the above-described determination may be performed based on, for example, a degree of similarity of motion vectors, which are calculated using the captured images captured at different times, for each of the image region of the face and the linear region.

On the other hand, in the above-described determination, when determining that the changes in the positional relationship between the two captured images are synchronized with each other, it may be determined that the face of the person included in the captured image is the display object.

In addition, when determining that the changes in the positional relationship between the two captured images are synchronized with each other, it may be determined whether or not the liner region represents a contour of the display object (a frame of an edge portion of a photograph, a display device, or the like). Further, in this determination, when determining that the linear region represents the outline of the display object, it may be determined that the face of the person is the display object, thereby further improving the accuracy of the determination that the face of the person is the display object.

Incidentally, in a captured image including a display object, it is estimated that the contour of the display object has the following characteristics. The contour of the display object is clear in the captured image, and there is a high possibility that the edge intensity of the pixels constituting the contour is strong. In the captured image, there is a high possibility that the linear shape representing the contour of the display object is likely to be substantially parallel or perpendicular to an orientation of the face of the person represented on the display object. In the captured image, there is a high possibility that a distance between the linear shape representing the contour of the display object and the face of the person represented on the display object is short.

Therefore, it may be determined whether or not the linear region represents the contour of the display object using these characteristics. Further, for example, this determination may be performed using the edge intensity at the position of each pixel constituting the linear region (the edge intensity for each pixel included in the specific pixel group). Alternatively, an inclination of a straight line approximating the linear region with respect to a line segment coupling positions of left and right eyes of the person represented in the image region of the face may be used as an index representing an orientation of the linear region with respect to an orientation of the face of the person, and the determination may be performed using this inclination of the approximate straight line. Alternatively, the distance between the approximate straight line and the position of a nose of the person represented in the image region of the face may be used as an index representing a distance between the linear region and the face of the person, and this determination may be performed using the distance between the approximate straight line and the position of the nose. Alternatively, this determination may be performed using any two of the edge intensity, the inclination of the approximate straight line, and the distance. Furthermore, this determination may be performed using all three of the edge strength, the inclination of the approximate straight line, and the distance, described above.

In addition, when the above-described determination is performed using the edge intensity, the inclination of the approximate straight line, and the distance as described above, a likelihood that the linear region represents the contour of the display object may be calculated using the edge intensity, the inclination of the approximate straight line, and the distance. Further, in this case, it may be determined whether or not the linear region represents the contour of the display object based on a result of magnitude comparison between the calculated likelihood and a predetermined likelihood threshold value.

Note that, for example, a likelihood R calculated by calculating the following Equation (1) may be used as the likelihood that the linear region represents the contour of the display object.

$$R=\alpha\times\mu+\beta\times\cos\theta+\gamma/d \qquad \text{Equation(1)}$$

Note that in Equation (1), $\mu$ is an average value of the edge intensity at the position of each pixel constituting the linear region (an average value of the edge intensity for each specific pixel constituting the specific pixel group). Further, in Equation (1), $\theta$ is the inclination of the approximate straight line for the linear region with respect to the line segment coupling positions of the left and right eyes of the person represented in the image region of the face. Further, d is the distance between the approximate straight line and the position of the nose of the person represented in the image region of the face. Note that $\alpha$, $\beta$, and $\gamma$ are weighting constants determined according to importance of each value of $\mu$, $\theta$, and d with respect to the likelihood R, and appropriate values are obtained in advance by, for example, an experiment.

Note that Equation (1) is used when the linear shape representing the contour of the display object is nearly parallel to the direction of the face of the person represented by the display object, for example, when the value of the inclination $\theta$ is $-45°\leq\theta\leq+45°$. On the other hand, when the linear shape representing the contour of the display object is nearly perpendicular to the direction of the face of the person represented by the display object, for example, when the value of the inclination $\theta$ is $-90°<\theta<-45°$ or $+45°<\theta\leq+90°$, the following equation (2) is used as the equation for calculating the likelihood R.

$$R=\alpha\times\mu+\beta\times\cos(90°-\theta)+\gamma/d \qquad \text{Equation (2)}$$

In the present embodiment, as described above, it is determined whether or not the face of the person represented in the captured image is the display object.

Note that the information processing apparatus 1 of FIG. 1 may be configured by a combination of a computer and software.

FIG. 4 illustrates a hardware configuration example of the computer 20.

The computer 20 includes each hardware of a processor 21, a memory 22, a storage device 23, a reading device 24, a communication interface 26, and an input/output interface 27 as components. These components are coupled to each other via a bus 28 so that data may be received and transmitted with each other between the components.

The processor 21 may be, for example, a single processor or a multi-processor or multi-core processor. The processor 21 uses the memory 22 to execute, for example, a captured image determination program that describes a procedure of a captured image determination process to be described later.

The memory 22 is, for example, a semiconductor memory, and may include a RAM area and a ROM area. The storage device 23 is, for example, a hard disk, a semiconductor memory such as a flash memory, or an external storage device. Note that RAM is an abbreviation for Random Access Memory. Further, ROM is an abbreviation is an abbreviation of Read Only Memory.

The reading device 24 accesses a removable storage medium 25 in accordance with an instruction from the processor 21. The removable storage medium 25 is realized by, for example, a semiconductor device (USB memory or the like), a medium (magnetic disk or the like) to/from which information is input/output by a magnetic action, a medium (CD-ROM, DVD or the like) to/from which information is input/output by an optical action, or the like. Note that USB is an abbreviation of Universal Serial Bus. CD is an abbreviation an abbreviation of Compact Disc. DVD is an abbreviation for Digital Versatile Disk.

For example, the communication interface 26 transmits and receives data via a communication network (not illustrated) in accordance with an instruction of the processor 21.

The input/output interface 27 acquires various types of data such as image data of a captured image sent from the camera 2. Further, the input/output interface 27 outputs a result of a determination process, which will be described later, output from the processor 21.

The program executed by the processor 21 of the computer 20 is provided in the following form, for example.

(1) Installed in the storage device 23 in advance.

(2) Provided by the removable storage medium 25.

(3) Provided from a server such as a program server to the communication interface 26 via the communication network.

Note that the hardware configuration of the computer 20 is an example, and the embodiment is not limited thereto. For example, some or all of the functions of the above-described functional units may be implemented as hardware such as an FPGA and an SoC. Note that FPGA is an abbreviation of a field programmable gate array. SoC is an abbreviation of System-on-a-chip.

Figure 5:
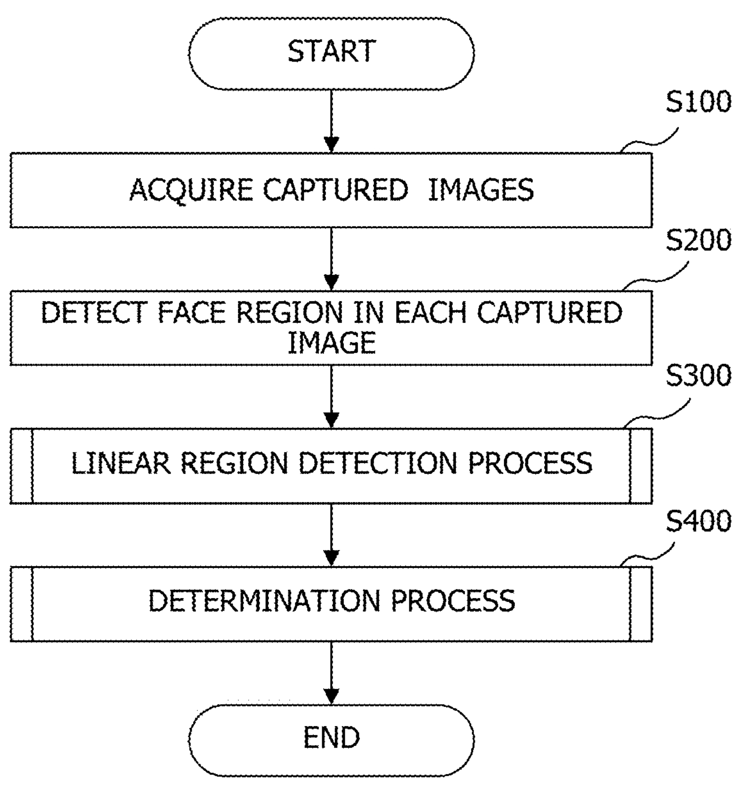
FIG. 5 is a flowchart illustrating process contents of a captured image determination process.

Next, the captured image determination process will be described. FIG. 5 is a flowchart illustrating the process contents of the captured image determination process. When the information processing apparatus 1 illustrated in FIG. 1 is configured by a combination of the computer 20 illustrated in FIG. 4 and software, a determination program describing the captured image determination process is caused to be executed by the processor 21.

In FIG. 5, first, a process of acquiring a plurality of captured images is performed in S100. In this process, a plurality of time-series images captured at different times by the camera 2 are acquired from the camera 2 via the input/output interface 27 and stored in the memory 22.

The processor 21 provides the function of the image acquisition unit 10 illustrated in FIG. 1 by executing S100 process.

Next, in S200, a process for detecting an image region of a face of a person is performed in each of the plurality of images acquired by the process in S100.

As described above, several methods are known as methods for detecting an image region of a face of a person from a captured image. In the process of S200, any of these methods may be used, and for example, the method proposed in Non-Patent Document 1 described above may be used.

The processor 21 provides the function of the first region detection unit 11 in FIG. 1 by executing S200 process.

Note that in the following description, an image region of a face of a person, which is an image region detected from a captured image by S200 process, may be referred to as a "face region".

Next, a linear region detection process is performed in S300. The linear region detection process is a process for detecting a linear region from the remaining region outside the face region detected by S200 process in each of the plurality of images acquired by S100 process. The linear region detection process will be described in detail later.

Next, a determination process is performed in S400. This determination process is a process for determining whether or not a face of a person represented in the plurality of images acquired by the process of S100 is a display object. This determination is performed in accordance with the above-described method based on the change state between the plurality of images regarding the positional relationship between the face regions detected by the processes in S200 and S300, respectively, and the linear region. Details of this determination process will be described later.

When S400 process is finished, the captured image determination process is finished.

Figure 6:
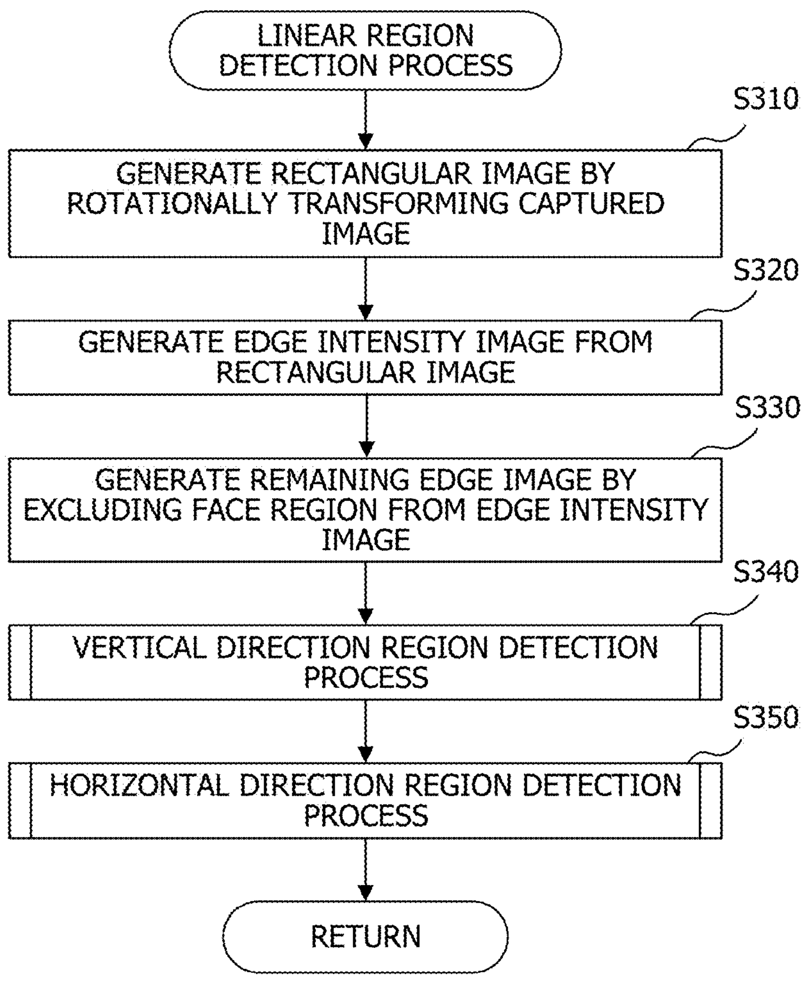
FIG. 6 is a flowchart illustrating the process contents of a linear region detection process.

Next, the linear region detection process which is the process of S300 in FIG. 5 will be described in detail. FIG. 6 is a flowchart illustrating the process contents of the linear region detection process. The processor 21 provides the function of the second region detection unit 12 in FIG. 1 by executing the linear region detection process.

Note that the linear region detection process is executed for each of the plurality of captured images, which are regarded as process targets, acquired by the process of S100 in FIG. 5.

In FIG. 6, first, in S310, a process of generating a plurality of rectangular images by rotationally transforming each of the plurality of captured images acquired by the process in S100 in FIG. 5 is performed.

As a transformation process for rotating an image, for example, an affine transformation is known. In the present embodiment, the affine transformation is assumed to be used as a method of a rotational transformation for a captured image.

In S310 process, first, a process for detecting positions of left and right eyes from the face region detected from the captured image by S200 process in FIG. 5 is performed. Next, a process for rotating the captured image and making a line segment coupling the positions of the left and right eyes horizontal is performed. Next, a trimming is performed on end portions of the captured image after the rotation conversion to generate a rectangular image in which upper and lower end sides are parallel to the above-described line segment and left and right end sides are perpendicular to the above-described line segment.

When the captured image acquired by S100 process in FIG. 5 already has such a feature of a rectangular image like this, S310 process may not be performed, and the subsequent processes performed on the rectangular image may be performed on the captured image.

Next, in S320, a process of generating a plurality of edge intensity images from the plurality of rectangular images generated in the process of S310 is performed.

Several methods are known for extracting edges from an image. In the present embodiment, it is assumed that an edge intensity image is generated from the rectangular image using a Laplacian filter among these methods.

Next, in S330, a process of generating a remaining edge intensity image obtained by excluding a region corresponding to the face region in the original captured image from the edge intensity image generated by the process of S320 is performed. By this process, in each of the plurality of edge intensity images generated by S320 process, the edge intensity of each pixel included in the region corresponding to the face region in the original captured image is set to "0", and a plurality of remaining edge intensity images are generated.

Next, the vertical direction region detection process is performed in the S340, and the horizontal direction region detection process is performed in the subsequent S350. Both of these processes are processes for detecting a linear region from a rectangular image according to the above-described method using a remaining edge intensity image generated by the S330 process. However, the vertical direction region detection process is a process for detecting a linear region in the vertical direction, and the horizontal direction region detection process is a process for detecting a linear region in the horizontal direction. Details of these processes will be described later.

When the processes of S340 and S350 ends, the linear region detection process ends, and the processor 21 returns the process to the captured image determination process of FIG. 5.

The process up to described above is the linear region detection process.

Figure 7:
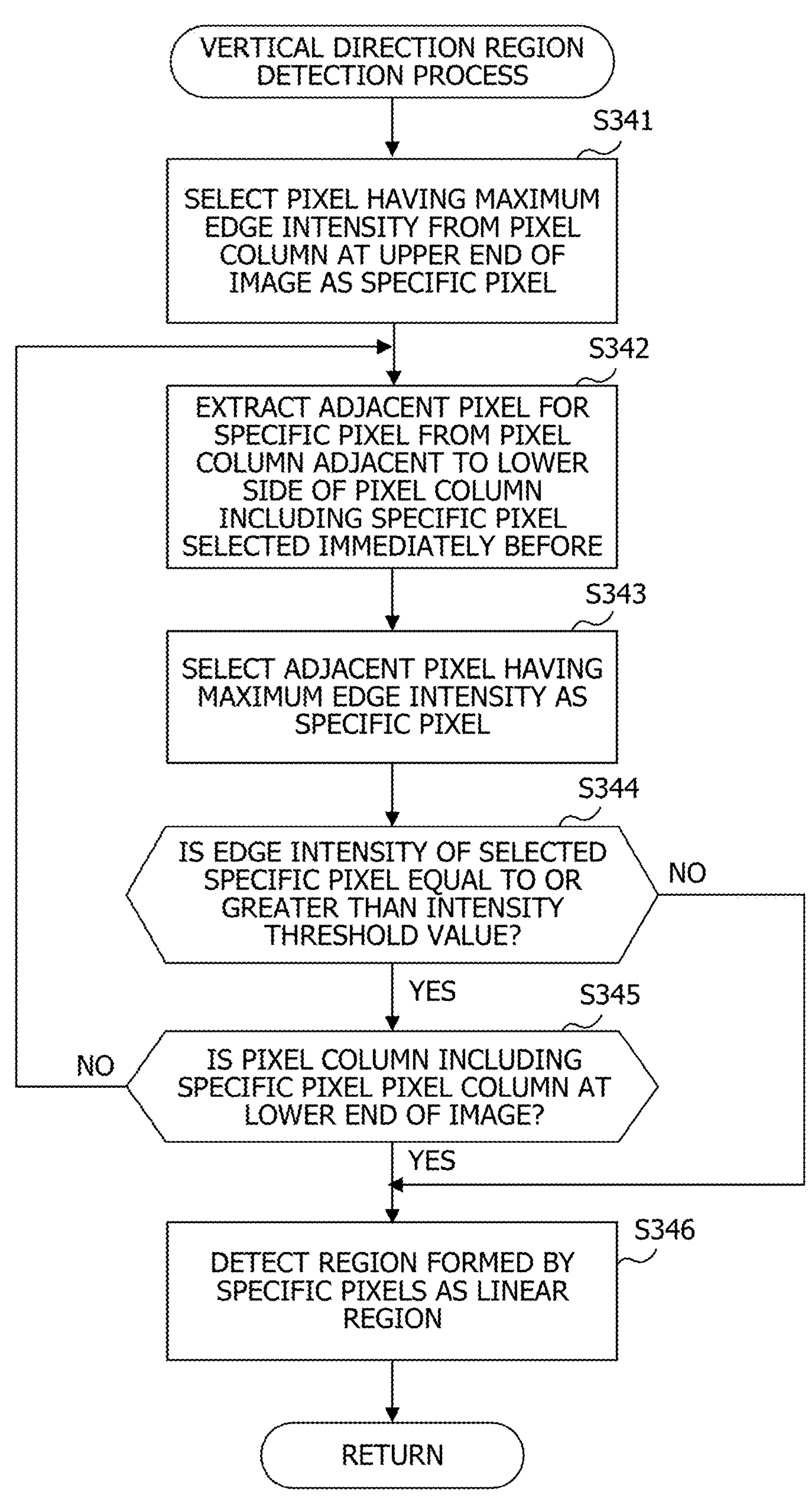
FIG. 7 is a flowchart illustrating process contents of a vertical direction region detection process.

Next, the vertical direction region detection process which is the process of S340 in FIG. 6 will be described in detail. FIG. 7 is a flowchart illustrating the process contents of the vertical direction region detection processing.

In FIG. 7, first, in S341, a process of selecting, as a first specific pixel, a pixel having the maximum edge intensity among the pixels included in the pixel column at the upper end in the remaining edge intensity image generated by the process in S330 is performed. The position of the first specific pixel selected by this process becomes a starting end of the linear region.

Next, in S342, a process of extracting a pixel (adjacent pixel) adjacent to the specific pixel from a pixel column adjacent to a lower side of a pixel column including the specific pixel selected by the process (the above-described S341 process or the later-described S343 process) executed immediately before this process is executed is executed.

Next, in S343, a process of selecting, as a next specific pixel, an adjacent pixel having the maximum edge intensity among the adjacent pixels extracted by the S342 process is performed.

Next, in S344, a process of determining whether or not the edge intensity of the specific pixel selected by the S343 process is equal to or greater than a predetermined intensity threshold value is performed.

This S344 process is for determining whether or not the edge intensity of the specific pixel selected by the S343 process is an edge intensity that can be regarded as an image region of a line region.

In the S344 determination process, when it is determined that the edge intensity of the specific pixel is equal to or greater than the predetermined intensity threshold value (when the determination result is YES), the process proceeds to S345. On the other hand, when it is determined in this determination process that the edge intensity of the specific pixel is less than the predetermined intensity threshold value (when the determination result is NO), the position of the specific pixel selected in the S343 process is regarded as an end of the linear region, and the process proceeds to S346.

Next, in S345, a process of determining whether or not the pixel column including the specific pixel selected by the S343 process is a pixel column at the lower end in the remaining edge intensity image generated by the S330 process is performed. In this determination process, when it is determined that the pixel column including the specific pixel is the pixel column at the lower end (when the determination result is YES), the position of the specific pixel selected in the S343 process is regarded as the end of the linear region, and the process proceeds to S346. On the other hand, in this determination process, when it is determined that the pixel column including the specific pixel is not the pixel column at the lower end (when the determination result is NO), there is a possibility that the linear region further continues in the lower direction of the image, and thus the process returns to S342 and the above-described process is repeated.

Next, in S346, a process of detecting a specific pixel group including each of the specific pixels selected by a repetition of the S341 process and the S343 process from the rectangular image as the linear region in the vertical direction is performed.

When the S346 process ends, the vertical direction region detection process ends, and the processor 21 returns the process to the linear region detection process of FIG. 6.

The processing up to described above is the vertical direction region detection process. The pixel column to be selected as the first specific pixel in the S341 process in the vertical direction region detection process is the pixel column at the upper end in the remaining edge intensity image. The edge intensity image is generated from the rectangular image, and an upper end side of the rectangular image is parallel to a line segment coupling the positions of the left and right eyes in the face region. Therefore, the repetition of the processes from S342 to S345 is an example of the repetition of a first selection in the case where the first pixel column is parallel to the line segment, and the detection of the linear region in the vertical direction by the S346 process corresponds to the detection of the first linear image region.

Figure 8:
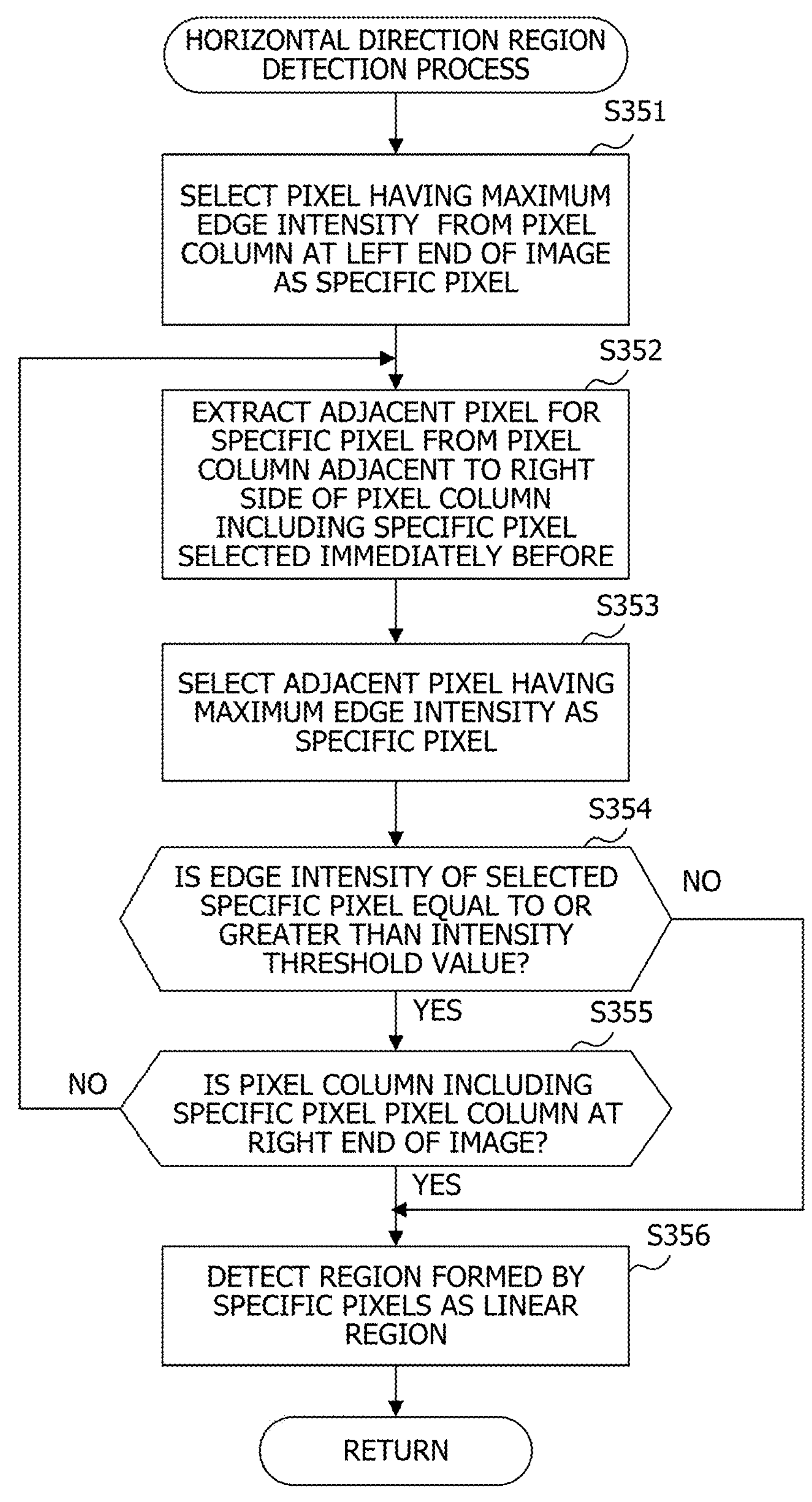
FIG. 8 is a flowchart illustrating process contents of a horizontal direction region detection process.

Next, the horizontal direction region detection process which is the S350 process in FIG. 6 will be described in detail. FIG. 8 is a flowchart illustrating the process contents of the horizontal direction region detection processing.

While the vertical direction region detection process described above searches for the linear region in the vertical direction from the top to the bottom of the image, the horizontal direction region detection process described below searches for the linear region in the horizontal direction from the left to the right of the image.

In FIG. 8, first, in S351, a process of selecting, as a first specific pixel, a pixel having the maximum edge intensity among the pixels included in the pixel column at the left end in the remaining edge intensity image generated by the process in S330 is performed. The position of the first specific pixel selected by this process becomes a starting end of the linear region.

Next, in S352, a process of extracting a pixel (adjacent pixel) adjacent to the specific pixel from a pixel column adjacent to the right side of the pixel column including the specific pixel selected by the process (the above-described S351 process or the later-described S353 process) executed immediately before this process is executed is executed.

Next, in S353, a process of selecting, as a next specific pixel, an adjacent pixel having the maximum edge intensity among the adjacent pixels extracted by the S352 process is performed.

Next, in S354, a process of determining whether or not the edge intensity of the specific pixel selected by the S353 process is equal to or greater than a predetermined intensity threshold value is performed.

Similarly to the S344 process in FIG. 7, this S354 process is for determining whether or not the edge intensity of the specific pixel selected by the S353 process is an edge intensity that can be regarded as an image region of a line region.

In the S354 determination process, when it is determined that the edge intensity of the specific pixel is equal to or greater than the predetermined intensity threshold value (when the determination result is YES), the process proceeds to S355. On the other hand, when it is determined in this determination process that the edge intensity of the specific pixel is less than the predetermined intensity threshold value (when the determination result is NO), the position of the specific pixel selected in the S353 process is regarded as the end of the linear region, and the process proceeds to S356.

Next, in S355, a process of determining whether or not the pixel column including the specific pixel selected by the S353 process is the pixel column at the right end in the remaining edge intensity image generated by the S330 process is performed. In this determination process, when it is determined that the pixel column including the specific pixel is the pixel column at the right end (when the determination result is YES), the position of the specific pixel selected in the S353 process is regarded as the right end of the linear region, and the process proceeds to S356. On the other hand, in this determination process, when it is determined that the pixel column including the specific pixel is not the pixel column at the right end (when the determination result is NO), since there is a possibility that the linear region further continues in the right direction of the image, the process returns to the S352, and the above-described process is repeated.

Next, in S356, a process of detecting a specific pixel group including each of the specific pixels selected by the repetition of the S351 process and the S353 process from the rectangular image as the linear region in the horizontal direction is performed.

When the S356 process ends, the horizontal direction region detection process ends, and the processor 21 returns the process to the linear region detection process of FIG. 6.

The process described above is the horizontal direction region detection process. The pixel column from which the first specific pixel is selected in the S351 process in the horizontal direction region detection process is the leftmost pixel column in the remaining edge intensity image. The edge intensity image is generated from a rectangular image, and the left end side of the rectangular image is perpendicular to the line segment coupling the positions of the left and right eyes in the face region. Therefore, the repetition of the processes from S352 to S355 is an example of the repetition of a second selection in the case where the first pixel column is perpendicular to the line segment, and the detection of the linear region in the horizontal direction by the S356 process corresponds to the detection of the second linear image region.

Figure 9A:
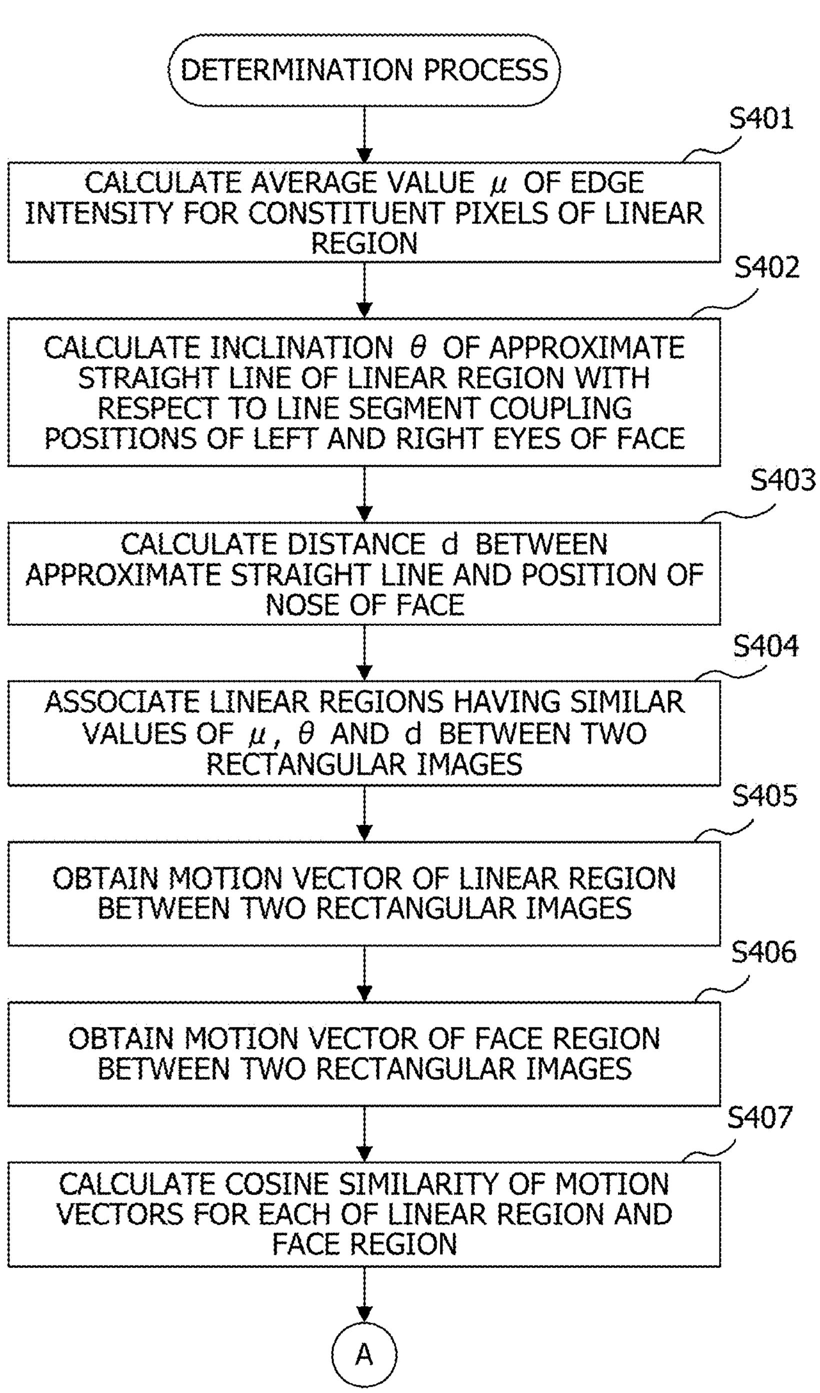
FIG. 9A is a flowchart (part 1) illustrating process contents of a determination process.
Figure 9B:
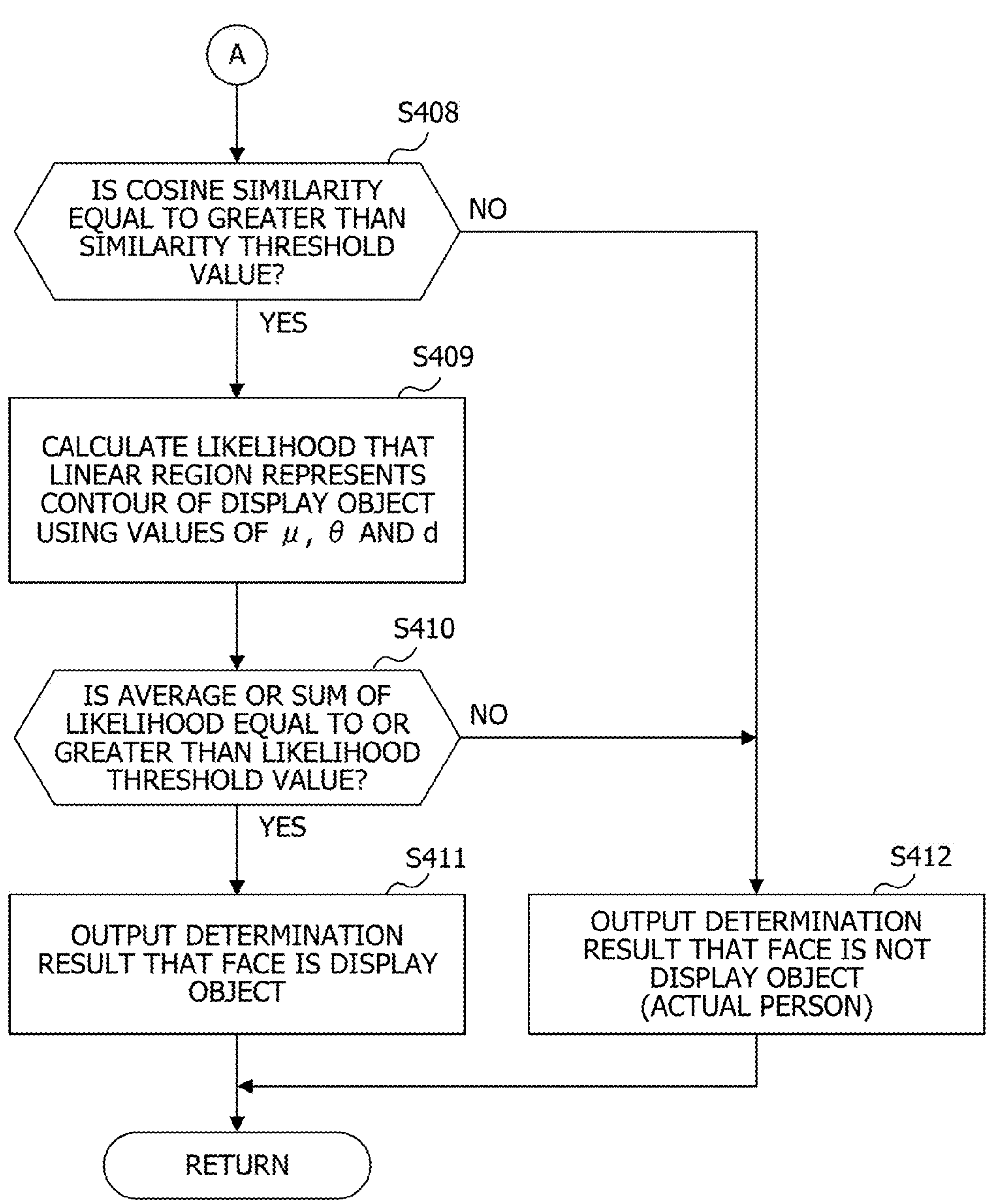
FIG. 9B is a flowchart (part 2) illustrating process contents of the determination process.

Next, the determination process which is the S400 process in FIG. 5 will be described in detail. FIG. 9A and FIG. 9B are flowcharts illustrating the process contents of a determination process. The processor 21 provides the function of the determination unit 13 in FIG. 1 by executing this determination process.

Each process from S401 to S405 illustrated in FIG. 9A is performed for each of the linear region in the vertical direction detected by the S340 process of FIG. 6 and the linear region in the horizontal direction detected by the S350 process of FIG. 6.

In FIG. 9A, first, in S401, for each of the rectangular images of the plurality of images acquired by the S100 process of FIG. 1, a process for calculating an average value $\mu$ of the edge intensity for the constituent pixels of the linear region is performed.

Next, in S402, a straight line approximating the linear region is obtained for each rectangular image of the plurality of images, and a process of calculating an inclination $\theta$ of the approximate straight line with respect to a line segment coupling the positions of the left and right eyes of the person represented in the face region in the rectangular image is performed. Note that, in the present embodiment, the approximate straight line for a linear region is obtained from the position of each constituent pixel of the linear region using the least-squares method, but the approximate straight line may be obtained using another method.

Next, in S403, a process of calculating a distance d between the approximate straight line obtained by the S402 process and the position of the nose of the person represented in the face region is performed in each of the rectangular images of the plurality of images acquired by the S100 process of FIG. 1.

Next, in S404, a process is performed in which the linear regions in each of the two rectangular images of the two images selected from the plurality of images acquired by the S100 process of FIG. 1 are associated with each other between the two rectangular images.

In S404 processing, as the two images, for example, images captured by the camera 2 continuously in time series among the plurality of images acquired by the S100 process of FIG. 1 are selected. Between such two images, there is no large difference in the linear region in which the outer frame of the photograph or the background of the photograph is represented, and therefore it is considered that the values of the average value $\mu$ of the edge intensity, the inclination $\theta$, and the distance d calculated by each of the processes from S401 to S403 are close to each other, respectively. Therefore, a process of associating the linear regions having each of these values close to each other between the rectangular images of the two images with each other between the two rectangular images is performed as the S404 process.

Next, in S405, a process of calculating a motion vector for the linear region associated by the S404 process based on the position of the linear region (for example, a barycentric position of the linear region) in each of the two rectangular images is performed.

Next, in S406, a process of calculating a motion vector for the face region in each of the two rectangular images is performed based on the position of the face region in each of the two rectangular images (for example, the position of the nose of the person represented in the face region).

Next, in S407, a process of calculating a cosine similarity between the motion vector for the linear region and the motion vector for the face region is performed. Note that in the S407 process, the average of the motion vectors of the linear regions in the vertical and horizontal directions is used as the motion vector of the linear region. Note that the motion vectors of the linear regions in the vertical and horizontal directions are calculated by the S405 process. Further, in the S407 process, the motion vector calculated by the S406 process is used as the motion vector for the face region.

Next, in S408 of FIG. 9B, a process of determining whether or not the value of the cosine similarity calculated by the S407 process is equal to or greater than a predetermined similarity threshold value is performed. This determination process is a process for determining whether or not changes in the positional relationship between the linear region and the face region are synchronized with each other. In this determination process, when it is determined that the value of the cosine similarity is equal to or greater than the similarity threshold value (when the determination result is YES), it is determined that the changes in the positional relationship between the linear region and the face region are synchronized, and the process proceeds to S409. On the other hand, in this determination process, when it is determined that the value of the cosine similarity is smaller than the similarity threshold value (when the determination result is NO), it is determined that changes in the positional relationship between the linear region and the face region are not synchronized, and the process proceeds to S412.

Next, in S409, a process of calculating the likelihood R that the linear region represents the contour of the display object is performed using each of the values of the average value μ of the edge intensity, the inclination θ, and the distance d calculated in each of the processes from S401 to S403. In this process, the above-described equation (2) is used to calculate the likelihood R for the linear region in the vertical direction, and the above-described equation (1) is used to calculate the likelihood R for the linear region in the horizontal direction.

Next, in S410, a process of magnitude-comparing an average value of the likelihood R of each of the linear regions in the vertical and horizontal directions with a predetermined likelihood threshold value is performed. This process is a process for determining whether or not the linear region represents the contour of the display object. In this the magnitude comparison, when it is determined that the average value of the likelihood R is equal to or larger than the likelihood threshold value (when the determination result is YES), it is determined that the linear region represents the contour of the display object, and the process proceeds to S411. On the other hand, in this the magnitude comparison, when it is determined that the average value of the likelihood R is smaller than the likelihood threshold value (when the determination result is NO), it is determined that the linear region does not represent the contour of the display object, and the process proceeds to S412.

In the S410 process, in order to determine whether or not the linear region represents the contour of the display object, a sum of the likelihoods R of the linear regions in the vertical and horizontal directions may be magnitude-compared with the likelihood threshold value.

Next, in S411, a process of outputting a determination result indicating that the face of the person represented in the plurality of images acquired by the S100 process of FIG. 5 is the display objects is performed. After that, when the S411 process ends, the determination process illustrated in FIGS. 9A and 9B ends, and the processor 21 returns the process to the captured image determination process of FIG. 5.

On the other hand, in S412, a process of outputting a determination result indicating that the face of the person represented in the plurality of images acquired by the S100 process of FIG. 5 is not the display object (is the actual person) is performed. After that, when the S412 process ends, the determination processing illustrated in FIGS. 9A and 9B ends, and the processor 21 returns the process to the captured image determination process of FIG. 5.

The process up to described above is the determination process.

When the computer 20 illustrated in FIG. 4 performs each of the above-described processes, it is possible to accurately determine whether or not the captured image is a captured image of a display object of a person.

Although the disclosed embodiments and their advantages have been described in detail, those skilled in the art may perform various modifications, additions and omissions without departing from the scope of the disclosure as set forth clearly in the appended claims.

For example, in the vertical direction region detection process of FIG. 7, one linear region in the vertical direction is detected. Instead of this, for example, the captured image acquired by the S100 process of FIG. 1 may be divided into two on the left and right, and the vertical direction region detection process may be performed on each of the divided images to detect two linear regions in the vertical direction.

Further, similarly, the captured image acquired by the S100 process of FIG. 1 may be vertically divided into two, and the horizontal direction region detection process of FIG. 8 may be performed on each of the divided images to detect two linear regions in the horizontal direction.

In addition, for example, in the vertical direction region detection process of FIG. 7, there is a case where a linear region in the vertical direction having an upper end of the image as a start end and a position above a lower end of the image as an end end is detected. When such a linear region is detected, the lower end of the image may be set as the start end, and a linear region in the vertical direction extending upward from the start end of the image may be further detected.

Such detection of the linear region in the vertical direction may be performed by sequentially performing a selection of a pixel of interest in the vertical region detection process of FIG. 7 upward from a pixel column at the lower end of the image. For example, when the determination result of S344 in FIG. 7 is NO, processes similar to the processes from S341 to S346 may be performed.

To explain the difference between this similar process and the process of FIG. 7, in this similar process, instead of the S341 process, process is performed in which a pixel having the maximum edge intensity among the pixels included in the pixel column at the lower end in the remaining edge intensity image is selected as the first specific pixel. In addition, instead of the S342 process, a process of extracting a pixel (adjacent pixel) adjacent to the specific pixel from a pixel column adjacent to and above the pixel column including the specific pixel selected by the process executed immediately before this process is executed is performed. Then, instead of the S346 process, a process of determining whether or not the pixel column including the specific pixel selected by the S343 process is the pixel column at the upper end in the remaining edge intensity image generated by the S330 process is performed.

In addition, for example, in the horizontal direction region detection process of FIG. 8, there is a case where a linear region in the horizontal direction is detected in which the left end of the image is set as the start end and the position on the left of the right end of the image is set as the end end. When such a linear region is detected, the right end of the image may be set as the starting end, and a linear region in the horizontal direction extending leftward of the image from the start end may be further detected.

Such detection of the linear region in the horizontal direction may be performed by sequentially selecting a pixel of interest in the horizontal region detection process of FIG. 8 from the pixel column at the right end of the image to the left. For example, when the determination result of S354 in FIG. 8 is NO, processes similar to the processes from S351 to S356 may be performed.

The difference between this similar process and the process of FIG. 7 will be described. In this similar process, instead of the S351 process, a process for selecting a pixel having the maximum edge intensity among pixels included in the pixel column at the right end in the remaining edge intensity image as the first specific pixel is performed. In addition, instead of the S352 process, a process of extracting a pixel (adjacent pixel) adjacent to the specific pixel from a pixel column adjacent to the left of the pixel column including the specific pixel selected by the process executed immediately before this process is executed is performed. Then, instead of the S356 process, a process of determining whether or not the pixel column including the specific pixel selected by the S353 process is the pixel column at the left end in the remaining edge intensity image generated by the S330 process is performed.

Note that when the plurality of linear regions in the vertical and horizontal directions are detected in this way, in the determination process of FIGS. 9A and 9B, each process from S401 to S405 is performed for each of the plurality of detected linear regions. Then, in the S407 process, the average of the detected motion vector of each of the plurality of linear regions which are detected is used as the motion vector of the linear region. Further, in the S409 process, a process of calculating the likelihood R indicating that the linear region of each of the plurality of linear region represents the contour of the display object is performed, and in the S410 process, the average value or the sum of the calculated likelihood R is compared with the likelihood threshold value.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A determination method comprising:

acquiring a plurality of images which are captured at different times by a camera;

detecting a first image region of a face of a person in each of the plurality of images;

generating, from each of the plurality of images, a respective rectangular image by rotationally transforming the image so that a line segment coupling left and right eyes of the person represented in the first image region is parallel to one end of the rectangular image;

detecting a first linear image region and a second linear image region in each of the plurality of rectangular images, wherein the first linear image region is detected by a detection process starting from a pixel column parallel to the line segment, and the second linear image region is detected by a detection process starting from a pixel column perpendicular to the line segment; and determining whether the face of the person is a display object based on a state of change in a positional relationship between the first image region and the first linear image region and a state of change in a positional relationship between the first image region and the second linear image region, between the plurality of images.

2. The determination method according to claim 1, further comprising:

detecting the first image region in each of the plurality of images;

generating, for the respective plurality of images, a plurality of edge intensity images in which an edge intensity at a position of each pixel is represented as a value of each pixel; and detecting the first linear image region in each of the plurality of images by using the plurality of edge intensity images.

3. The determination method according to claim 2, further comprising:

selecting a pixel adjacent to a specific pixel and having a maximum edge intensity from an adjacent pixel column to a pixel column including the specific pixel with respect to a plurality of remaining edge intensity images obtained by excluding the first image region from each of the plurality of edge intensity images;

performing the selecting the pixel for each pixel column by starting from a pixel column adjacent to a first pixel column which is arranged at one end of the respective remaining edge intensity images while setting a pixel having a maximum edge intensity among pixels included in the first pixel column as a first specific pixel; and detecting the first linear image region in each of the plurality of images by detecting an image region which is formed by a specific pixel group obtained by repeating the selecting the pixel in each of the plurality of remaining edge intensity images.

4. The determination method according to claim 1, wherein in the determining whether the face of the person is the display object, whether the change in the positional relationship is synchronized between the plurality of images is determined, and when determining that the change is not synchronized, the face of the person is determined not to be the display object.

5. The determination method according to claim 4, further comprising:

determining whether the change in the positional relationship is synchronized based on a similarity of a motion vector for each of the first image region and the second linear image region which are calculated using the plurality of images.

6. The determination method according to claim 1, wherein in the determining whether the face of the person is the display object, whether the change in the positional relationship is synchronized between the plurality of images is determined, and when determining that the change is synchronized, whether the first linear image region represents a contour of the display object, and when determining that the first linear image region represents the contour of the display object, the face of the person is determined to be the display object.

7. The determination method according to claim 6, wherein the determination as to whether the linear image region represents the contour of the display object is performed using at least one of an edge intensity at a position of each pixel included in the first linear image region, an inclination of a straight line which approximates the first linear image region with respect to a line segment which couples positions of left and right eyes of the person represented in the first image region, and a distance of the straight line from a position of a nose of the person represented in the first image region.

8. The determination method according to claim 7, wherein further comprising:

calculating a likelihood that the first linear image region represents the contour of the display object using the edge intensity at the position of each pixel included in the first linear image region, the inclination and the distance; and determining whether the first linear image region represents the contour of the display object based on a result of magnitude comparison between the likelihood and a predetermined likelihood value.

9. A non-transitory computer-readable recording medium storing a determination program for causing a computer to execute a process of:

acquiring a plurality of images which are captured at different times by a camera;

detecting a first image region of a face of a person in each of the plurality of images;

generating, from each of the plurality of images, a respective rectangular image by rotationally transforming the image so that a line segment coupling left and right eyes of the person represented in the first image region is parallel to one end of the rectangular image;

detecting a first linear image region and a second linear image region in each of the plurality of rectangular images, wherein the first linear image region is detected by a detection process starting from a pixel column parallel to the line segment, and the second linear image region is detected by a detection process starting from a pixel column perpendicular to the line segment; and determining whether the face of the person is a display object based on a state of change in a positional relationship between the first image region and the first linear image region and a state of change in a positional relationship between the first image region and the second linear image region, between the plurality of images.

10. An information processing apparatus comprising:

a memory; and a processor coupled to the memory and configured to:

acquire a plurality of images which are captured at different times by a camera;

detecting a first image region of a face of a person in each of the plurality of images;

generating, from each of the plurality of images, a respective rectangular image by rotationally transforming the image so that a line segment coupling left and right eyes of the person represented in the first image region is parallel to one end of the rectangular image;

detecting a first linear image region and a second linear image region in each of the plurality of rectangular images, wherein the first linear image region is detected by a detection process starting from a pixel column parallel to the line segment, and the second linear image region is detected by a detection process starting from a pixel column perpendicular to the line segment; and determine whether the face of the person is a display object based on a state of change in a positional relationship between the first image region and the first linear image region and a state of change in a positional relationship between the first image region and the second linear image region, between the plurality of images.

* * * * *